GEORGE W. SMITH.
Improvement in Adjustable Cut-off.

No. 122,198.

2 Sheets--Sheet 1.

Patented Dec. 26, 1871.

Witnesses:
A. W. Almqvist
Francis McArdle

Inventor:
Geo. W. Smith
PER
Wm. [illegible]
Attorneys.

GEORGE W. SMITH.
Improvement in Adjustable Cut-off.

No. 122,198.  Patented Dec. 26, 1871.

Witnesses:
A. W. Almqvist
Francis McArdle

Inventor:
George W. Smith
Per Munn & Co.
Attorneys.

UNITED STATES PATENT OFFICE.

GEORGE W. SMITH, OF NEW HAVEN, CONNECTICUT.

IMPROVEMENT IN ADJUSTABLE CUT-OFF VALVES.

Specification forming part of Letters Patent No. 122,198, dated December 26, 1871.

Specification describing certain Improvements in Adjustable Cut-Off Valves, invented by GEORGE W. SMITH, of New Haven, in the county of New Haven and State of Connecticut.

Figure 1:
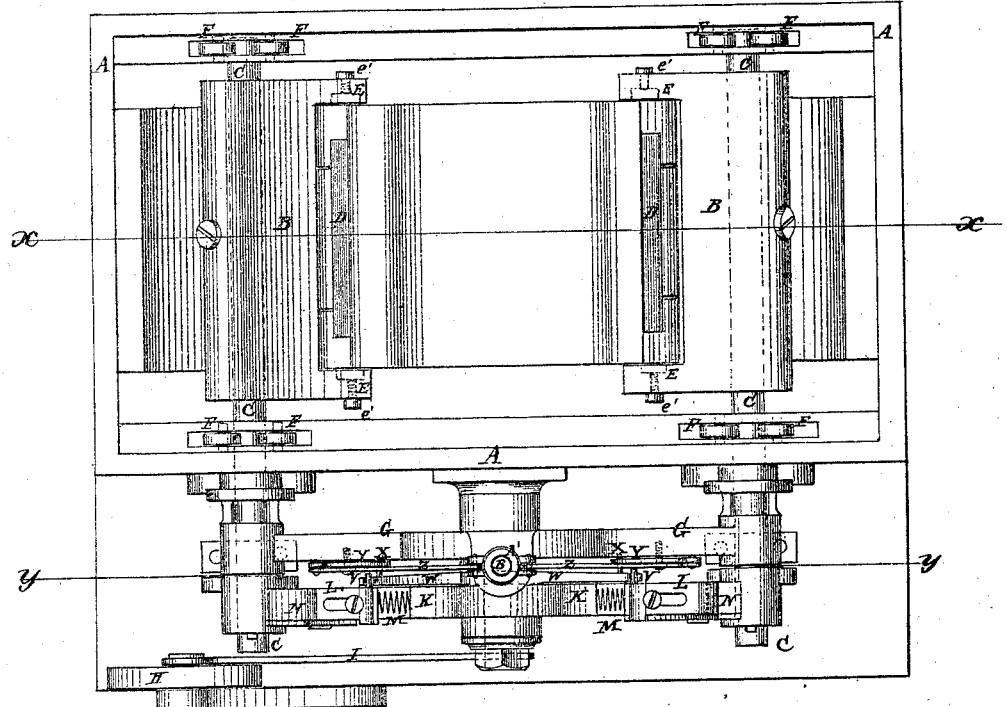
Figure 2:
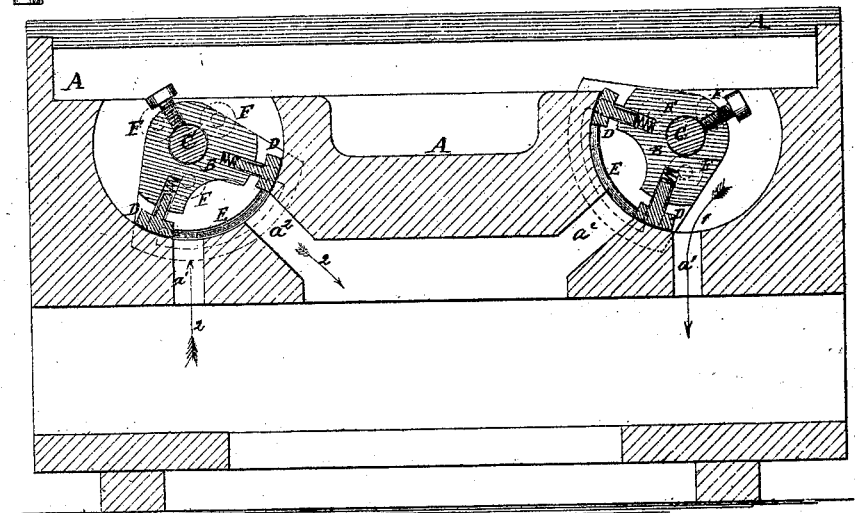
Figure 3:
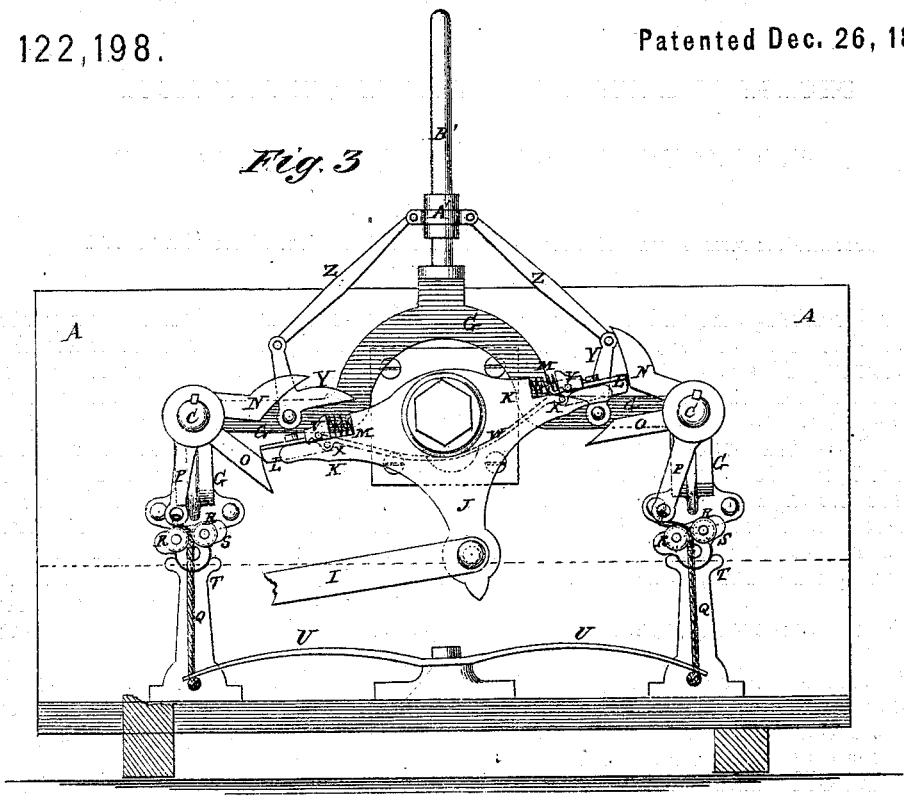
Figure 4:
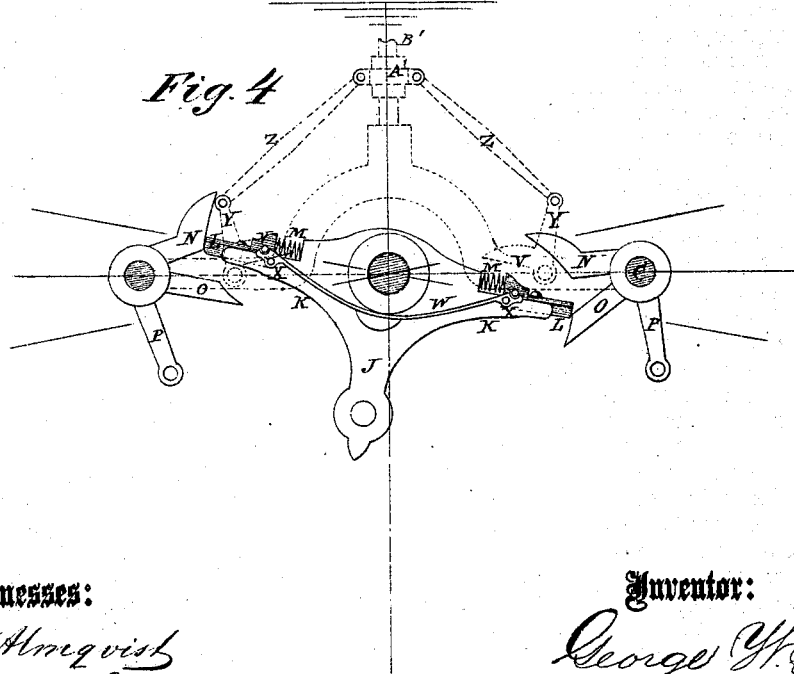

Figure 1, Sheet 1, is a top view of my improved valve, the top of the steam-chest being removed. Figure 2, sheet 1, is a detail vertical section of the same taken through the line $x\ x$, Fig. 1. Figure 3, Sheet 2, is a side view of the same. Fig. 4, Sheet 2, is a detail sectional view of the same taken through the line $y\ y$, Fig. 1, looking outward.

Similar letters of reference indicate corresponding parts.

My invention has for its object to furnish an improved valve for steam-engines, which shall be so constructed that it may be easily adjusted to cut off the steam at any desired point; which will cut off the steam instantly, and will hold the valve steadily in either position while the shaft continues its movement; and it consists in the construction and combination of the various parts, as hereinafter more fully described.

A is the steam-chest, from which the steam enters the cylinders through the inlet-ports $a^1$, as indicated by the arrow 1. The steam exhausts from the cylinders through the ports $a^1\ a^2$, as indicated by the arrows 2. B are the valves which are adjustably attached to the shafts C. D are slides, the faces of which are made of such a breadth as to entirely cover and close the ports $a^1\ a^2$ when brought over them. Upon the inner sides of the slides D are formed ribs which enter grooves in the valves B. The slides D may be held out against the valve-seat by springs, as shown in Fig. 2, or by steam pressure, the steam being allowed to enter the grooves in which the ribs of said slides work through grooves in the sides of said ribs, as shown in Fig. 1. The valves B are guarded against steam leakage by packing, E, set in curved grooves in the end flanges of the valves B, which overlap the ends of the valve-seat, as shown in Figs. 1 and 2. The packing E is set out to take up the wear or to adjust it by set-screws $e'$, which pass in through the said end flanges of the valves B, as shown in Fig. 1. The shafts C revolve upon friction-wheels F, three to each journal, as shown in Fig. 1, and in dotted lines in Fig. 2, which are pivoted in boxes in the sides of the steam-chest A. The shafts C pass out through stuffing-boxes in the sides of the steam-chest A, and their outer parts revolve in bearings in the brackets or frame G attached to the sides of the steam-chest A, or to some other suitable support. H represents the driving-shaft, to which is pivoted, by means of an eccentric strap or other suitable means, one end of a connecting-rod, I, the other end of which is pivoted to the lower end of the arm J, formed solidly upon or rigidly attached to the walking-beam K, and projecting downward at right angles with the length of said beam. The walking-beam K is pivoted at its center and midway between the ends of the valve-shaft C to a gudgeon attached to the sides of the valve-chest A. L are toes or catches attached to the ends of the walking-beam K, and which are held out by springs N connected with their inner ends, and which may be let into the beam K so as to be entirely out of sight. The outer ends of the catches L enter the space or angle between the arms N O of the three-armed plates N O P, rigidly attached to the ends of the valve-shaft C, so that as the said beam K oscillates it may move the valves B alternately in opposite directions. When the beam K is in a horizontal position the valves B are in such a position as to close both inlet-ports $a^1$. As the beam K begins to move in either direction one of the toes L strikes against the shoulder of the upper arm N of the one valve, and the other toe L strikes against the shoulder of the arm O of the other valve, so that both the valves will be moved at the same time, the one to open the inlet-port $a^1$, and the other to open the exhaust-port $a^2$, as shown in Fig. 2. As the beam K continues its movement the descending toe L moves along the curved face of the lower arm O, holding the valve with the exhaust-port open until the said end of the beam has returned to a horizontal position. The ascending toe L moves up along the curved face of the arm N until the point is reached at which it is desired to cut off the steam. At this point the ascending toe L is released, and is forced back by the pressure of the arm N, allowing the valve to move back to its center and close the inlet-port, which port remains closed until the end of the beam has completed its stroke and returned to a horizontal position. To the lower end of the arm P of the three-armed plates N O P is attached one end of a rope or chain, Q, which passes between two friction-rollers, R, which are pivoted to a block, S, which is pivoted to a standard or bracket, T. The other end of the rope or chain Q is connected with a spring, U, which spring U should have sufficient strength to bring the valves B back to their centers and close the inlet-ports whenever the toes or catches L are released. To the inner sides of the toes or catches L are attached pins V, which enter notches in the ends of the springs W, the middle part of which is secured to the middle part of the beam K, so that the toes L may be held out against the arms N O by the force of the said spring W. To the inner side of the ends of the spring W are attached pins, X, which, as the ends of the beam K move upward, strike against the lower arms of the bent levers Y, which stops the movement of the spring W, and allows the pin V to be raised out of the notch in the end of the spring W, releasing the toe L, and allowing the valve to spring to its center, closing the inlet-valve and cutting off the steam. The bent levers Y are pivoted at their angles to the bracket or frame G, and to the ends of their upper arms are pivoted the lower ends of the connecting-rods Z, the upper ends of which are pivoted to the governor, which is represented by a slide, A', upon the governor-shaft, B', so that the point of cut-off may be regulated automatically by the governor.

Having thus described my invention, I claim as new and desire to secure by Letters Patent—

1. The combination of the adjustable packing E with the grooved flanges of the ends of the valves B and with the slides D, substantially as herein shown and described, and for the purpose set forth.

2. The combination of the walking-beam K J provided with spring-catches L M at its ends, the three-armed plates N O P, ropes or chains Q, and springs U with each other and with the valve-shafts C and driving-shaft H, substantially as herein shown and described, and for the purposes set forth.

3. The combination of the pins V, spring W, pins X, bent levers Y, and connecting-rod Z with the spring-toes L, walking-beam K, and governor A', substantially as herein shown and described, and for the purpose set forth.

GEORGE W. SMITH.

Witnesses:
  HENRY E. PARDEE,
  HIRAM STEVENS.

(152)